H. BRYHNI.
PHOTOMETER.
APPLICATION FILED AUG. 29, 1907.

959,051.

Patented May 24, 1910.

UNITED STATES PATENT OFFICE.

HAAKON BRYHNI, OF BÓRSEN, NEAR TRONDHJEM, NORWAY.

PHOTOMETER.

959,051. Specification of Letters Patent. Patented May 24, 1910.

Application filed August 29, 1907. Serial No. 390,627.

*To all whom it may concern:*

Be it known that I, HAAKON BRYHNI, a subject of the King of Norway, residing at Bórsen, near Trondhjem, Norway, have invented certain new and useful Improvements in Photometers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to a device for indicating the intensity of light, commonly known as a photometer, and is especially adapted to determine the time of exposure of a photographic plate or film.

In my photometer, I make use of the well-known fact that the diameter of the pupil of the human eye changes rapidly according to the intensity of light, to which the eye is subjected.

Figure 1:
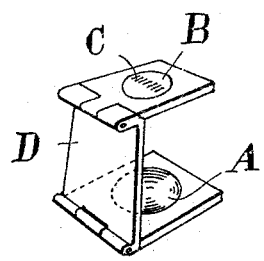
Figure 2:
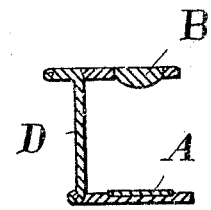
Figure 3:
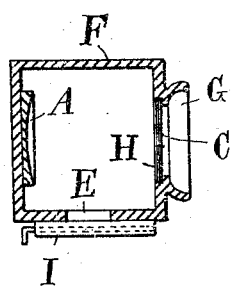

In the drawing, Figure 1 is a perspective view of one form of the new apparatus, while Fig. 2 is a section through the same; Fig. 3 is a section through another form of the apparatus.

A is a mirror and B a lens, preferably a plano-convex lens, the flat face being the upper face. On this upper face of the lens a scale C is marked in the glass. The mirror A and the lens B are mounted in parallel plates of a folding frame D, as sometimes used for magnifying glasses.

In the use of the apparatus, one eye is held close to the lens B. The enlarged image of the pupil of the eye and the scale C will be reflected in the mirror A, and the diameter of the pupil can be directly measured by the scale C. If desired, a table for calculating the time of exposure for a certain kind of plate or film and a certain size of blender may be attached to the frame D.

The apparatus shown in Fig. 2 consists of a box F, which is closed so that no light can enter it except through the opening G, which is closed by a glass plate H. The box is provided with a second opening E, which, however, is closed by a diaphragm I. When the box F is held with the opening G tight against one eye, no light can reach the eye, and the pupil therefore will assume its largest size. When, however, the diaphragm I is gradually opened, light will be admitted to the interior of the box through the opening E, and, consequently, the pupil will successively grow smaller, which can be observed in the mirror A. The glass H is provided with two marks C. When the pupil has grown to assume a diameter equal to the distance between these two marks, the size of the opening uncovered by the diaphragm I will indicate the intensity of the light. This method is an indirect way of measuring the size of the pupil.

Claims.

1. In a photometer the combination of a mirror, and a transparent body mounted at a fixed distance from said mirror and having marks thereon to be reflected in the said mirror together with an image of the pupil.

2. In a photometer the combination of a mirror, and a lens mounted at a fixed distance from said mirror, the said lens being provided with marks to be reflected in the said mirror together with an image of the pupil of the eye.

In testimony that I claim the foregoing as my invention, I have signed my name in presence of two subscribing witnesses.

HAAKON BRYHNI.

Witnesses:
SVIRRE BERG,
W. RÖMING.